(12) United States Patent
Li (10) Patent No.: US 8,045,656 B2
(45) Date of Patent: Oct. 25, 2011

(54) WEATHER BAND RADIO HAVING DIGITAL FREQUENCY CONTROL

(75) Inventor: Junsong Li, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 814 days.

(21) Appl. No.: 12/002,050

(22) Filed: Dec. 14, 2007

(65) Prior Publication Data

US 2009/0154603 A1 Jun. 18, 2009

(51) Int. Cl.
*H04L 27/06* (2006.01)

(52) U.S. Cl. ......... 375/344; 375/316; 375/324; 375/340

(58) Field of Classification Search .................. 375/344, 375/136, 147, 219, 316, 340, 324
See application file for complete search history.

(56) References Cited

U.S. PATENT DOCUMENTS

| 5,418,815 | A * | 5/1995 | Ishikawa et al. ............. 375/216 |
| 5,483,686 | A * | 1/1996 | Saka et al. ................. 455/182.2 |
| 5,663,989 | A * | 9/1997 | Fobbester ...................... 375/344 |
| 6,078,578 | A * | 6/2000 | Matsumoto ................... 370/350 |
| 6,192,089 | B1 * | 2/2001 | Corleto et al. ................ 375/344 |
| 6,526,268 | B1 | 2/2003 | Marrah et al. |
| 6,710,715 | B2 | 3/2004 | Deeds |
| 7,050,784 | B2 | 5/2006 | Clark |
| 7,486,747 | B1 | 2/2009 | Bagley et al. |
| 7,802,173 | B2 | 9/2010 | Chan et al. |
| 2006/0003728 | A1 * | 1/2006 | Tuttle et al. ................... 455/333 |
| 2006/0109939 | A1 * | 5/2006 | Ciccarelli et al. ............. 375/350 |
| 2009/0028250 | A1 * | 1/2009 | Taipale et al. ................. 375/259 |

OTHER PUBLICATIONS

U.S. Appl. No. 12/002,067, filed Dec. 14, 2007, entitled "Combining Soft Decisions in a Weather Band Radio," by Junsong Li.
U.S. Patent and Trademark Office, Office Action mailed May 11, 2011 in U.S. Appl. No. 12/002,067.
U.S. Patent and Trademark Office, Office Action mailed Nov. 23, 2010 with Reply filed on Feb. 22, 2011 and Supplemental Reply filed on May 3, 2011 in U.S. Appl. No. 12/002,067.
U.S. Patent and Trademark Office, Restriction Requirement mailed Oct. 13, 2010 with Election filed on Nov. 3, 2010 in U.S. Appl. No. 12/002,067.
U.S. Appl. No. 12/002,067 Reply to Office Action Mailed May 11, 2011 filed on Aug. 9, 2011.

* cited by examiner

*Primary Examiner* — Leon Flores (74) *Attorney, Agent, or Firm* — Trop, Pruner & Hu, P.C.

(57) ABSTRACT

In one embodiment, the present invention includes a digital mixer to receive and digitally mix incoming weather band radio data with a control signal, a digital demodulator to demodulate the data to obtain a demodulated signal, and a digital feedback loop coupled between the demodulator and the digital mixer. The digital feedback loop includes a loop filter to receive the demodulated signal and to generate a filtered output and a fine tune controller to receive the filtered output and a frequency control signal and to generate the control signal based on them. In this way, audible artifacts caused by a frequency step change occurring in an analog front end to which the digital circuitry is coupled can be reduced or removed.

16 Claims, 5 Drawing Sheets

WEATHER BAND RADIO HAVING DIGITAL FREQUENCY CONTROL

BACKGROUND

Weather band radios enable a user to tune into National Oceanic and Atmospheric Administration (NOAA) weather radio (NWR) communications. In the United States, regions have one or more weather radio stations that provide continuous radio broadcasting of weather conditions. This can be especially useful in case of weather-related or other emergency scenarios.

The weather broadcasting occurs in a relatively narrow bandwidth of the radio frequency (RF) spectrum. Specifically, a total of 175 kilohertz (kHz) bandwidth is available at between 160.4 Megahertz (MHz)-160.55 MHz, allowing a minimal 25 kHz for each channel. This narrowband operation can complicate radio design. In contrast, frequency modulation (FM) radio allows for much wider bandwidth for each channel, allowing much greater headroom for design of an FM receiver.

Currently available weather radios have been developed using analog radio technology which, although technically feasible, can be expensive to build, is not readily miniaturized to a small form factor, and has relatively minimal programmable capabilities.

SUMMARY OF THE INVENTION

According to one aspect of the present invention, an apparatus is provided to enable weather band radio signals to be received and processed using a digital signal processor (DSP). In one such embodiment, a receiver may include an analog front end to receive incoming weather band radio signals. The front end can include an analog mixer to mix the incoming weather band radio signals with a controllable oscillator frequency to generate a complex downmixed signal, and an analog-to-digital converter (ADC) to convert the complex downmixed signal to a digital signal. Note that the controllable oscillator frequency can be stepwise adjusted.

The digital signal can be provided to the DSP, which can include functionality to implement a digital mixer to mix the digital input with a fine tune control signal, a channel filter, a frequency modulation (FM) demodulator to demodulate the channel filter output to generate a FM demodulated signal, and a feedback loop. The channel filter has a bandwidth that can be digitally controlled based upon a strength of the incoming radio signals. The feedback loop can include a loop filter to receive the FM demodulated signal and to generate a filtered output, where the loop filter is controllable based on the stepwise adjustment. The feedback loop can further include a fine tune controller to receive the filtered output and a frequency control signal and to generate the fine tune control signal. In addition to weather band operation, the DSP may be able to handle incoming amplitude modulation (AM) and FM radio signals.

Yet another aspect of the present invention is directed to a DSP or other programmable processor to handle digital demodulation of weather band signals. The DSP may include hardware that is controlled by software, firmware or combinations to operate as a digital mixer to receive and digitally mix incoming radio sample data with a control signal, a digital demodulator to demodulate the incoming radio sample data to obtain a demodulated signal, and a digital feedback loop coupled between the demodulator and the digital mixer. The digital feedback loop may include a loop filter to receive the demodulated signal and to generate a filtered output, and a fine tune controller to receive the filtered output and a frequency control signal and to generate the control signal based on them.

Yet another aspect of the present invention is directed to a method for digitally processing incoming weather band signals to provide voice and text messages to output devices, such as a speaker and display. In one embodiment, the method may be initiated by receiving and mixing weather band radio signals in an analog mixer with a controllable oscillator frequency to generate a complex downmixed signal. The downmixed signal is then converted to a digital signal for further processing. Specifically, the digital signal is mixed with a fine tune control signal in a digital mixer, an output of which is then channel filtered and demodulated. The demodulated signal can then be filtered in a loop filter responsive to a stepwise adjustment to the controllable oscillator frequency. Responsive to the filtered output and a frequency control signal, the fine tune control signal can be generated and provided to control the digital mixer.

DETAILED DESCRIPTION

In various embodiments, a weather band radio receiver may be provided using a digital signal processor (DSP) to handle demodulation and related functions. In this way, an entire weather band radio receiver can be implemented on a single semiconductor die, including both analog and digital circuitry. In doing so, however, certain complexities may exist, including the potential for generating audible noise while performing automatic frequency control (AFC) in the analog portion. Thus embodiments may further provide an ability to compensate for such noise to reduce or prevent audible artifacts.

Before discussing a detailed implementation of one such radio receiver, a background of the weather radio spectrum and message code format is in order. As described above, weather radio exists at a relatively narrow bandwidth. Currently, in the United States this bandwidth of approximately 175 kHz provides for the presence of up to seven channels each having a 25 kHz bandwidth. The RF carrier modulation for radio communications is narrowband FM with +/−5 kHz maximum deviation. In turn, the sub-carrier modulation of the message information uses audio frequency shift keying (AFSK).

Figure 1:
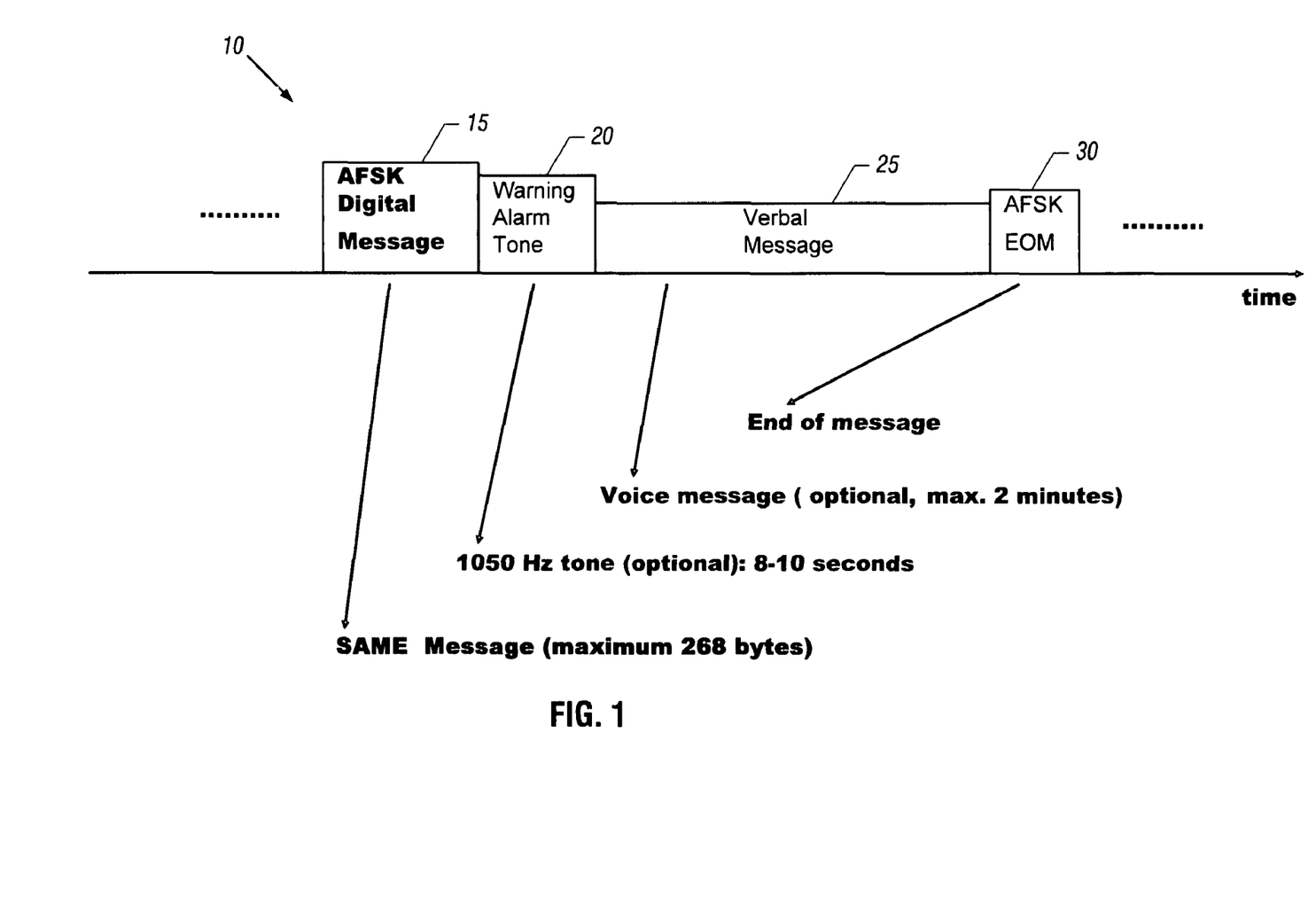
FIG. 1 is a block diagram of a NWR message code format in which communications occur.

Referring now to FIG. 1, shown is a block diagram of a NWR message code format. As shown in FIG. 1, message 10 includes an AFSK digital message 15, which may correspond to a specific area message encoding (SAME) message having a maximum of 268 bytes. In various embodiments, three identical digital messages may be provided in a burst communication, each of which includes the same data repeated three times. Thus this digital message 15 may be demodulated and then further processed to generate a text message suitable for display on a display of a radio or an associated display, e.g., of a video device. The SAME message is phase continuous at bit boundaries, and is transmitted at a bit rate of 520.83 bits per second. Logic zero information is represented at a frequency of 1562.5 Hertz (Hz), while logic one information is represented at a frequency of 2083.3 Hz. The message may have a frequency deviation of between approximately +/−4 kHz to +/−5 kHz. Note that because there is no error control/parity or stop and start bits, the message information is transmitted three times in a row.

Furthermore, the message itself may be separated into a preamble portion and a message portion. The preamble portion may correspond to a predetermined number of bits, e.g., 128 bits, that may be data with very rich bit transitions (i.e., 10101011 repeated 16 times). As will be described further below, these bit transitions may be used to acquire the incoming message of the SAME transmission and identify a synchronization point of the preamble so that the following message can be properly demodulated and processed.

Referring still to FIG. 1, the message code format 10 then may include an optional warning alarm tone (WAT) 20 which may be a 1050 Hz tone of between approximately 8-10 seconds. Following that, a verbal message 25 may be transmitted, which is also optional and may have a maximum message length of approximately 2 minutes. This voice message may have a frequency deviation of +/−1 kHz to +/−4.5 kHz. After this verbal message 25, an AFSK end of message (EOM) indicator 30 may be transmitted to indicate the end of the message.

Figure 2:
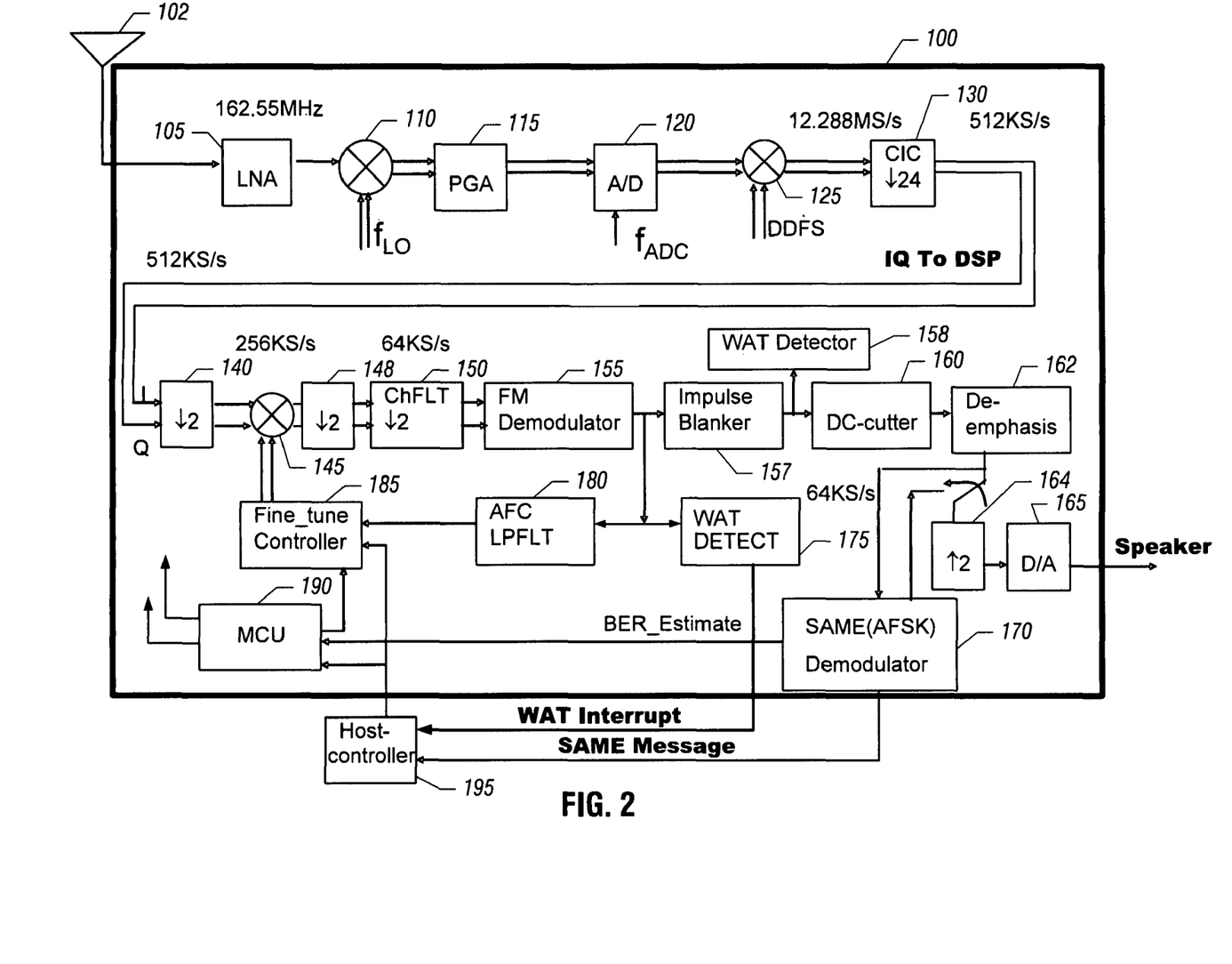
FIG. 2 is a block diagram of a weather band radio receiver in accordance with an embodiment of the present invention.

Referring now to FIG. 2, shown is a block diagram of a weather band receiver 100 in accordance with an embodiment of the present invention. As described above, receiver 100 may be a single die semiconductor device including both analog and digital circuitry. Furthermore, the vast majority of the demodulation and processing of the radio signals can be performed digitally, allowing better sensitivity and channel selectivity. Thus as will be described further below, the majority of the components shown in FIG. 2 may be implemented in a DSP or other programmable processing circuitry. Furthermore, channel fine tuning may be implemented digitally to relax analog frequency accuracy requirements. While not shown for ease of illustration, understand that radio receiver 100 may be a multi-function device including both receive and transmit capabilities, as well as providing functionality for multi-band operation. Specifically, embodiments may be implemented in a single chip device for use with AM, FM and weather band transmissions. That is, the receiver may include a code store (e.g., a nonvolatile memory) including software, firmware, or combinations thereof to enable the DSP or other circuitry to operate in an AM, FM, or weather band mode.

As shown in FIG. 2, receiver 100 may receive incoming weather band radio signals via an antenna 102, coupled to an analog front end of the receiver. The front end may include a low noise amplifier (LNA) 105. In turn, LNA 105 is coupled to an analog mixer 110 which is controlled by a local oscillator (LO) frequency $f_{LO}$. In various embodiments, $f_{LO}$ may be controlled by a microcontroller unit (MCU) 190 which, as shown in the embodiment of FIG. 2, may be an on-chip microcontroller, although the scope of the present invention is not limited in this regard. As will be described further below, when controlling the frequency of the LO, step frequency changes occur, as the control is not continuous. Such step changes, which may be 3-5 kHz step changes, can be a significant percentage of a channel bandwidth, i.e., 25 kHz. In turn, this can cause audible undesired noise effects such as popping or clicking. To overcome such effects, digital compensation may be provided in the DSP, as will be described further below.

As shown in FIG. 2, the downmixed complex outputs from mixer 110, which may be at a low intermediate frequency (IF) (e.g., at approximately 128 kHz) are provided to a programmable gain amplifier (PGA) 115, the outputs of which are provided to an analog-to-digital converter (ADC) 120 that operates at a sampling frequency of $f_{ADC}$ and which may also be controlled by MCU 190, in various embodiments. The digitized information is provided to a direct digital frequency synthesizer (DDFS) 125 which outputs digitized complex baseband data at a rate of approximately 12.288 Megasamples per second (MS/s). These samples are provided to a decimator 130, which may decimate or reduce the sampling rate to a lower rate. Specifically, in the embodiment shown in FIG. 2, decimator 130 may operate to resample the incoming data to a lower rate of 512 kilosamples per seconds (KS/s). The output I and Q data from decimator 130 is thus provided to the DSP of receiver 100, which may generally correspond to all the additional circuitry shown in FIG. 2 (with the exception of digital-to-analog converter (DAC) 165 and MCU 190). As such, embodiments may include an article in the form of a computer-readable medium onto which instructions are written. These instructions may enable the DSP or other programmable processor to perform filtering, demodulation, and other processing in accordance with an embodiment of the present invention.

More specifically, the incoming IQ data is provided to a digital decimator 140, which again reduces the sample rate in half to 256 KS/s. The sampled data is provided to a digital mixer 145 where it is mixed with fine tuning control signals from a fine tune controller 185. The output of digital mixer 145 is decimated in decimator 148 which may reduce the sampling frequency to 64 KS/s, and which in turn is coupled to a channel filter 150. Channel filter 150 may have a variable bandwidth and may be a narrowband channel filter to enable reduced noise effects. Channel filter 150 may be controlled to be a narrow bandwidth channel filter for use in weak signal conditions in order to reduce the noise effect; while a broad bandwidth channel filter may be used at strong signal levels. In one embodiment, MCU 190 measures the signal strength and controls the filter bandwidth accordingly. The filtered output is in turn provided to a FM demodulator 155, which will be described further below.

The receive chain continues from FM demodulator 155, the output of which is provided to an impulse blanker 157, and then in turn to a DC cutter 160, to a de-emphasis block 162 and to an interpolator 164 to increase the sampling rate of the demodulated FM data (i.e., the voice message data), which is then converted to an analog signal in DAC 165, which in turn is coupled off-chip to a speaker.

Furthermore, the FM demodulated data is also provided to a SAME (AFSK) demodulator 170 which may perform SAME demodulation to thus extract the SAME message for transmission to a host controller 195 to which receiver 100 is coupled. The SAME message may correspond to a text message that can be displayed on a display of a radio or other output device. SAME demodulator 170 may also generate a bit error rate (BER) signal, which can be provided to MCU 190.

Note that receiver 100 may include multiple WAT detectors 158 and 175 which can detect a WAT message and provide an appropriate response, e.g., a WAT interrupt signal to host controller 195.

As further shown in FIG. 2, the FM demodulated signal may also be provided to a feedback loop that includes an automatic frequency control (AFC) loop filter 180 and fine tune controller 185, which together may finely control the frequency provided to digital mixer 145 to enable the mixing of the incoming digital data in digital mixer 145 to provide fine frequency tuning and compensate for any noise introduced by step frequency changes that occur in analog mixer 110 as a result of a change to the LO frequency. Thus fine tune controller 185 may provide fine tuning based on process, voltage and temperature (PVT) effects, as well as step frequency changes, to enable small frequency errors. While shown with this particular implementation in the embodiment of FIG. 2, the scope of the present invention is not limited in this regard.

Figure 3:
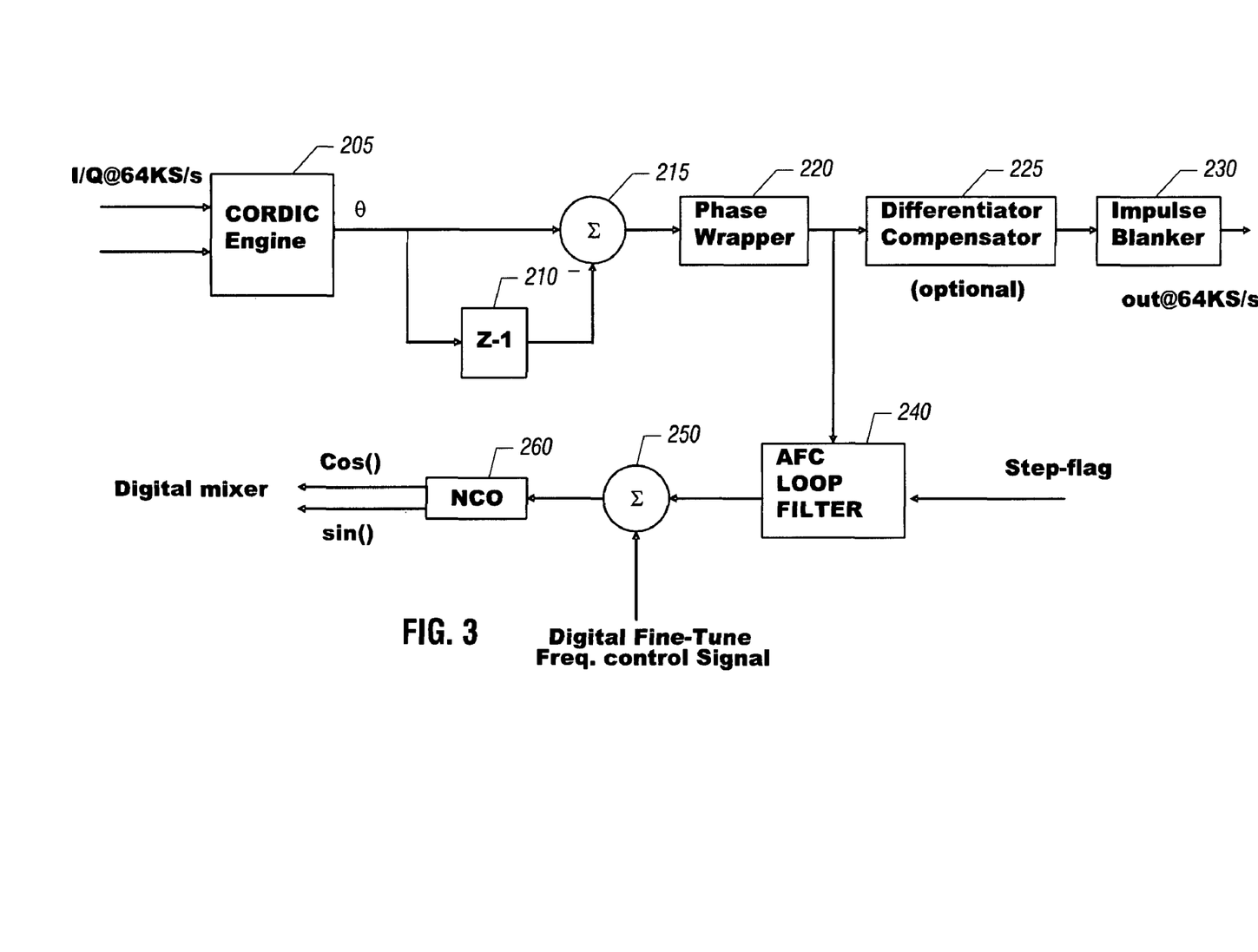
FIG. 3 is a more detailed view of a portion of a demodulator and feedback loop in accordance with one embodiment of the present invention.

Referring now to FIG. 3, shown is a more detailed view of a portion of the FM demodulator and feedback loop in accordance with an embodiment of the present invention. Specifically, as shown in FIG. 3, a coordinate rotation digital computer (CORDIC) engine 205 may be coupled to receive the incoming filtered I and Q digital data. CORDIC engine 205 may perform CORDIC operations to obtain both magnitude and phase information, i.e., polar coordinate information, although only the phase information is needed. In one embodiment, CORDIC engine 205 may be implemented using minimal amounts of hardware, e.g., adders, accumulators and comparators, which may be operated according to a state machine. Furthermore, a small lookup table that includes a minimal amount of values for different incoming information may also be present. After further processing, the phase portion of the CORDIC function may correspond to the FM demodulated signal.

Thus as shown in FIG. 3, the phase portion of the output of CORDIC engine 205 is provided to a differentiator or feed forward filter 210, the delayed output of which, along with the phase output itself, is provided to a combiner block 215, which combines the inputs and provides them to a phase wrapper 220. Phase wrapper 220 may operate to move the phase information to within a predetermined range, e.g., 0 to π. The demodulated FM output of phase wrapper 220 is provided to an optional differentiator compensator 225 and then an impulse blanker 230 which can remove an unwanted impulse in the signal, and then provide a demodulated FM signal output at 64 KS/s.

For the feedback loop, the demodulated output of phase wrapper 220 is provided to an AFC loop filter 240 which is also coupled to receive a control signal, e.g., from an MCU. More specifically, the control signal may correspond to a step flag to indicate occurrence of a step change to the analog oscillator that generates the $f_{LO}$ for the analog mixer in the front end of the receiver (i.e., mixer 110 of FIG. 2). In the absence of the control signal, AFC loop filter 240 may act as a low pass filter that operates at a first filter state. When the control signal is received, the filter state is changed and loop filter 240 filters out any undesired noise as a result of the step change occurring in the analog front end. Thus AFC loop filter 240 may be controllably adjusted (i.e., its state changed) when a frequency change occurs in the analog front end.

The output of AFC loop filter 240, which may be an estimated frequency offset, including any frequency step caused by the analog front end step change, is provided to a summing block 250 which is further coupled to receive and combine a digital fine tune frequency control signal with the estimated frequency offset. This signal may be received, e.g., from the MCU and may be responsive to a measured frequency offset between the output of the oscillator that generates the $f_{LO}$ for the analog mixer (e.g., mixer 110 of FIG. 2) and the frequency of the desired channel. The combined output of summing block 250, which may be a phase offset correction signal, is thus provided to a numerically controlled oscillator (NCO) 260 which in turn generates complex frequency signals that are provided to the digital mixer (i.e., digital mixer 145 of FIG. 2). In one embodiment, NCO 250 may be implemented using the same CORDIC engine 205, operated in reverse to generate the sine and cosine values.

Figure 4:
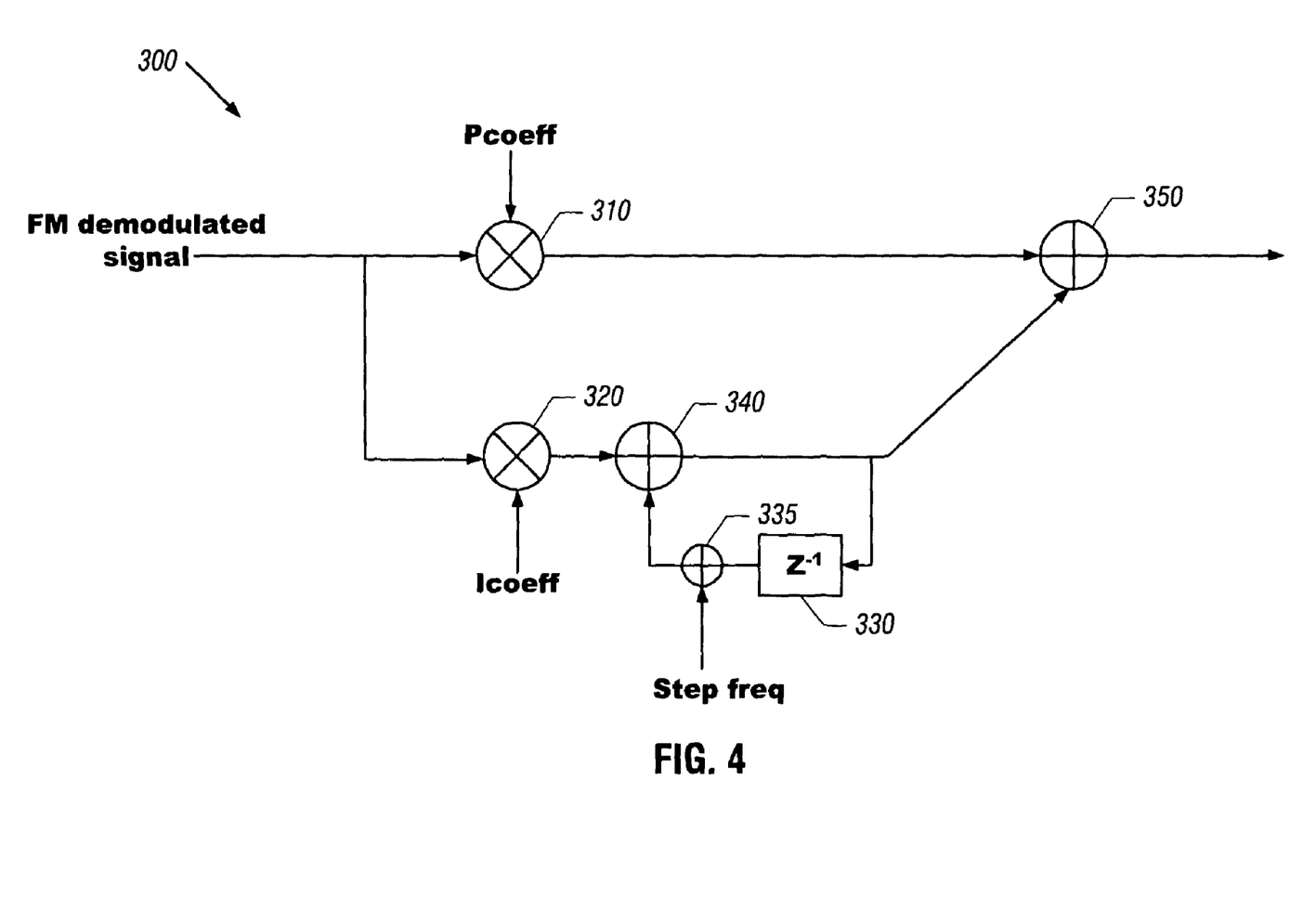
FIG. 4 is a block diagram of one implementation of a loop filter in accordance with an embodiment of the present invention.

Further details of AFC loop filter 240 are shown in the example embodiment of FIG. 4, which is a block diagram of one implementation of a loop filter in accordance with an embodiment of the present invention. As shown in FIG. 4, loop filter 300 is coupled to receive the demodulated FM signal at a first multiplier 310 and a second multiplier 320, where the signal is multiplied with predetermined coefficients (e.g., P coefficients in multiplier 310 and I coefficients in multiplier 320). In one embodiment, the coefficient for both I and P may be between 0 and 1, and the multipliers may be implemented as Proportional Integral (PI)-controllers. The output of multiplier 320 is provided to a summer 340 that is further coupled to receive an output of a filter 330, which is controlled based on the step flag received from the MCU, which provides information on the analog VCO frequency step size. Thus the control of the I-control path of the loop filter that occurs in a combiner 335 is realized based on the frequency step signal (i.e., whether a step occurs and whether it is a positive or negative step) received in combiner 335, which then provides an updated output to summer 340. The summed output is provided to a summing block 350, where it is combined with the multiplied output of multiplier 310 to thus provide the output of loop filter 300 which may be a phase offset signal provided to summing block 250 of FIG. 3.

Figure 5:
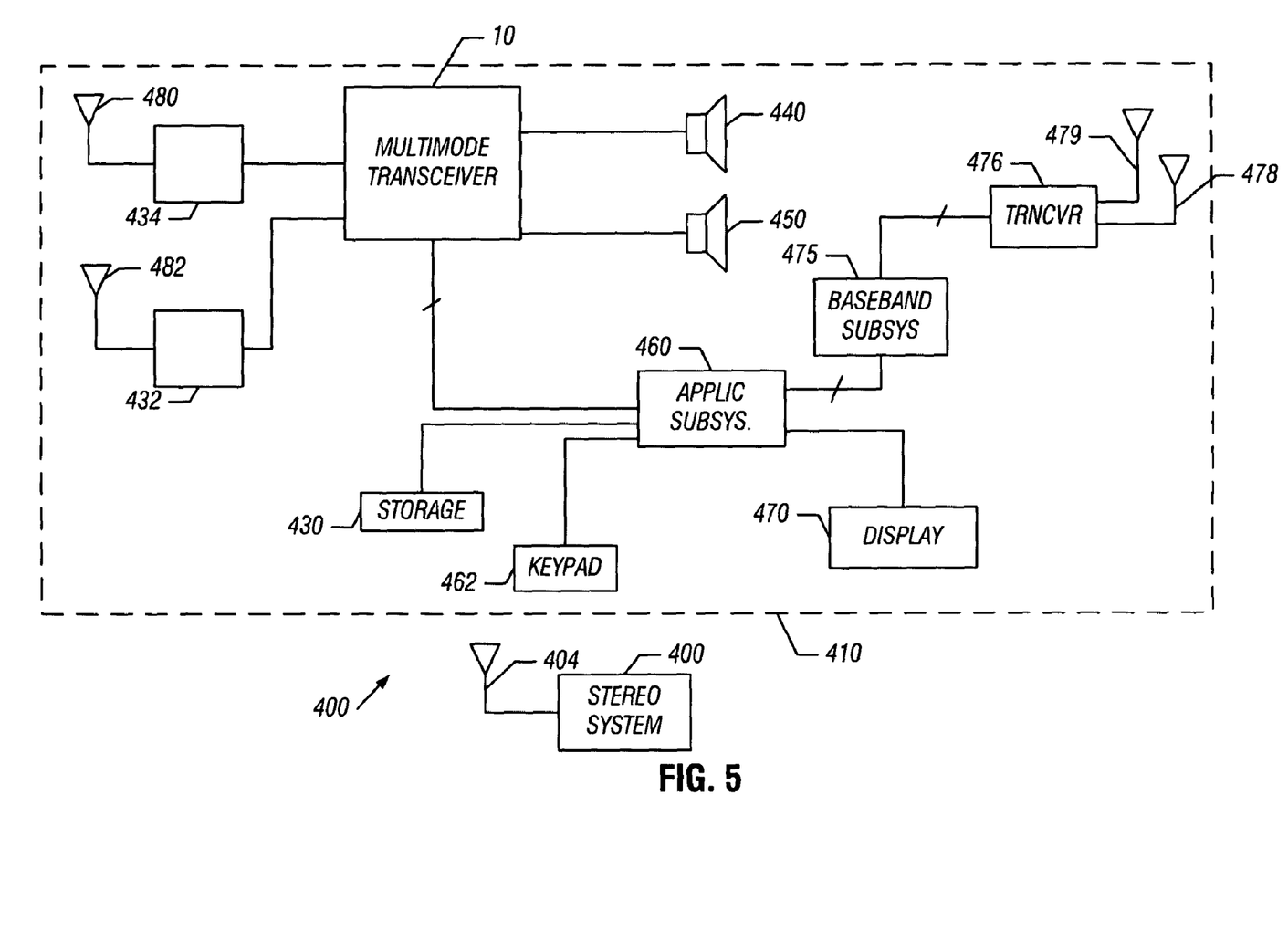
FIG. 5 is a block diagram of a system in accordance with an embodiment of the present invention.

Referring to FIG. 5, in accordance with some embodiments of the invention, a multimode transceiver 10, which may include weather band receiver 100 of FIG. 2, may be part of a multimedia portable wireless device 410, which, in turn, is part of a wireless system 400. As examples, the wireless device 410 may be a multi-function, multi-band radio, a cellular telephone or PDA with the capability of playing music downloads, part of a wireless link between a satellite antenna and a radio receiver, a terrestrial receiver, etc. Of course, wireless device 410 may be a stand alone weather band radio, in other embodiments.

Among its other various functions, the wireless device 410 may store digital content on a storage 430, which may be a flash memory or hard disk drive, as a few examples. The wireless device 410 generally includes an application subsystem 460 that may, for example, receive input from a keypad 462 of the wireless device 410 and display information, such as weather-related information obtained from a SAME message, on a display 470. Furthermore, the application subsystem 460 may generally control the retrieval and storage of content from the storage 430 and the communication of, e.g., audio with the multimode transceiver 10. As shown, the multimode transceiver 10 may be directly connected to speakers 440 and 450 for output of audio data. As depicted in FIG. 5, the multimode transceiver 10 may be coupled by a matching network 434 to a receiver antenna 480 and may be coupled by a matching network 432 to the transmit antenna 482.

Although the wireless device 410 may include the speakers 440 and 450, it may be desirable to play sounds that are generated by the wireless device 410 over a more sophisticated speaker system. Therefore, in accordance with some embodiments of the invention, the wireless device 410, via the multimode transceiver 10, may broadcast content to be played over an FM channel to the receiver of an adjacent stereo system 500 (as an example). As shown, the stereo system 500 includes an RF antenna 504 for purposes of receiving the transmitted content from the wireless device 410.

In accordance with some embodiments of the invention, the wireless device 410 may have the ability to communicate over a communications network, such as a cellular network. For these embodiments, the wireless device 410 may include a baseband subsystem 475 that is coupled to the application subsystem 460 for purposes of encoding and decoding baseband signals for this wireless network. Baseband subsystem 470 may be coupled to a transceiver 476 that is connected to corresponding transmit and receive antennas 477 and 478.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    an analog front end to receive incoming weather band radio signals, the analog front end including:
        an analog mixer to mix the incoming weather band radio signals with a controllable oscillator frequency to generate a complex downmixed signal, wherein the controllable oscillator frequency is stepwise adjusted; and
        an analog-to-digital converter (ADC) to convert the complex downmixed signal to a digital signal;
    a direct digital frequency synthesizer (DDFS) and a decimator coupled to the analog front end to generate from the digital signal a digital input to provide to a digital signal processor (DSP) at a first sampling rate;
    the DSP coupled to the decimator, wherein the DSP includes:
        a digital mixer to mix the digital input with a fine tune control signal;
        a channel filter coupled to receive an output of the digital mixer;
        a frequency modulation (FM) demodulator to demodulate the channel filter output to generate a FM demodulated signal;
        a feedback loop coupled between the FM demodulator and the digital mixer, the feedback loop including:
            a loop filter to receive the FM demodulated signal and to generate a filtered output, wherein the loop filter is controllable based on the stepwise adjustment; and
            a fine tune controller to receive the filtered output and a frequency control signal and to generate the fine tune control signal; and
    a microcontroller unit (MCU) to generate the frequency control signal for the fine tune controller.

2. The apparatus of claim 1, wherein the loop filter is to receive a step change signal indicative of the stepwise adjustment to the controllable oscillator frequency, and to compensate for an audible artifact caused by the stepwise adjustment.

3. The apparatus of claim 2, wherein the loop filter is controllable responsive to the step change signal to update a state of the loop filter, and the fine tune controller includes a numerically controlled oscillator (NCO) to generate complex control signals to provide to the digital mixer.

4. The apparatus of claim 1, wherein the channel filter is controlled to operate at a first bandwidth if a level of the incoming weather band radio signals is less than a threshold level, otherwise to operate at a second bandwidth, the second bandwidth larger than the first bandwidth.

5. The apparatus of claim 1, wherein the DSP further includes:
    an audio frequency shift keying (AFSK) demodulator to receive the FM demodulated signal and to process the FM demodulated signal to generate a specific area message encoding (SAME) message.

6. The apparatus of claim 5, wherein the apparatus comprises a single semiconductor die including the analog front end and the DSP.

7. The apparatus of claim 6, wherein the DSP is further adapted to demodulate incoming amplitude modulation (AM) radio signals and FM radio signals.

8. The apparatus of claim 1, wherein the FM demodulator includes:
    a coordinate rotation digital computer (CORDIC) engine to receive incoming digital samples and to generate a phase output;
    a feed forward filter to receive and filter the phase output;
    a summer coupled to receive and combine the filtered phase output and the phase output into phase information; and
    a phase wrapper to shift the phase information to within a predetermined range.

9. An apparatus comprising:
    a digital mixer to receive and digitally mix incoming radio sample data including weather band information with a control signal;
    a digital demodulator coupled to the digital mixer to demodulate the incoming radio sample data to obtain a demodulated signal; and
    a digital feedback loop coupled between the demodulator output and the digital mixer, the digital feedback loop including:
        a digital loop filter to receive the demodulated signal and to generate a filtered output; and
        a fine tune controller to receive the filtered output and a frequency control signal and to generate the control signal, wherein the control signal is to compensate for a step change occurring to a control frequency of an analog stage coupled to the digital mixer, and the digital loop filter is to receive a step change signal indicative of the step change to the control frequency, and to compensate for an audible artifact caused by the step change.

10. The apparatus of claim 9, wherein the digital loop filter is to receive the step change signal from a microcontroller unit (MCU), wherein the MCU is to generate a signal that causes the step change.

11. The apparatus of claim 9, further comprising a digital signal processor (DSP) including the digital mixer, the digital demodulator, and the digital feedback loop.

12. The apparatus of claim 11, wherein the apparatus comprises a single semiconductor die including the analog stage and the DSP and is further adapted to demodulate incoming amplitude modulation (AM) radio signals and FM radio signals.

13. A method comprising:
    receiving incoming weather band radio signals and mixing the incoming weather band radio signals in an analog mixer with a controllable oscillator frequency to generate a complex downmixed signal, wherein the controllable oscillator frequency is stepwise adjusted;
    converting the complex downmixed signal to a digital signal;
    mixing the digital signal with a fine tune control signal in a digital mixer;
    channel filtering an output of the digital mixer;

demodulating the channel filter output to generate a demodulated signal;

filtering the demodulated signal in a loop filter responsive to the stepwise adjustment and generating a filtered output, including receiving in the loop filter a step change signal indicative of the stepwise adjustment to the controllable oscillator frequency, and compensating for an audible artifact caused by the stepwise adjustment; and generating the fine tune control signal responsive to the filtered output and a frequency control signal.

14. The method of claim 13, further comprising generating in a numerically controlled oscillator (NCO) complex control signals corresponding to the fine tune control signal to provide to the digital mixer.

15. The method of claim 13, further comprising receiving the step change signal from a microcontroller unit (MCU), wherein the MCU is to generate a control signal to cause the stepwise adjustment.

16. The method of claim 13, further comprising mixing the digital signal, channel filtering the output, and demodulating the channel filter output in a digital signal processor (DSP), wherein the output of the digital mixer is channel filtered at a first bandwidth if a level of the incoming weather band radio signals is less than a threshold level, otherwise the output is channel filtered at a second bandwidth larger than the first bandwidth.

* * * * *